United States Patent Office 3,336,250
Patented Aug. 15, 1967

3,336,250
CHLORHYDRIN-BISPHENOL REACTION PRODUCTS AND VARNISH CONTAINING SAME
Francis Frederick Koblitz, Erdenheim, Pa., assignor to Pennsalt Chemicals Corporation, Philadelphia, Pa., a corporation of Pennsylvania
No Drawing. Filed June 21, 1963, Ser. No. 289,739
10 Claims. (Cl. 260—18)

This invention relates to epoxy resins which are prepared from or modified with bis(2-hydroxy-meta-alkylphenyl)alkanes.

It is known that epoxy resins may be prepared by the condensation of bisphenols with compounds containing a reactive halogen atom and an oxirane ring. Bisphenol A (p,p'-isopropylidenebisphenol) in particular has been widely used as the diphenol in such reactions, and 1-chloro-2,3-epoxy propane (epichlorohydrin) has been commonly used as the co-reactant.

It is also known that varnishes may be manufactured from certain epoxy resins and certain drying oils. The bodying process which is employed commercially requires heating and stirring for long periods of time to achieve miscibility of epoxy resin and drying oil.

It has now been discovered that by the use of certain bisphenols, especially selected on the basis of their molecular structure, epoxy resins may be prepared by condensation into homopolymers or co-polymers which have improved resistance to chemical attack and also have excellent physical properties including improved flexibility, oil miscibility and light color.

The particular class of bisphenols from which these new resins are made is restricted to those bisphenols which are substituted in a meta position with an alkyl or alkylaryl group of substantial size. By "substantial size" is meant a group at least as large as a butyl group, and preferably having a secondary or, especially preferred, a tertiary carbon atom connected to each of the phenyl nuclei of the disphenol. While the theoretical explanation for the improvements offered by such bisphenols is not entirely clear, experimental evidence indicates that the bulky group is so oriented that it reduces secondary bonding valences between polymer molecules, producing more amorphous resins. Epoxy resins are linear polyether compounds which contain an average of more than one epoxy group,

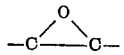

per molecule. Polyethers are commonly produced by the reaction of polyhydroxy alcohols and phenols with a haloepoxyhydrocarbon, most commonly 1-chloro-2,3-epoxypropane, usually called epichlorohydrin, in an alkaline medium. Epoxy resins are widely used and are produced commercially with a substantial variety of properties.

These properties generally depend upon the degree of linear polymerization which is commonly controlled by varying the relative proportions of the reactants. This degree of polymerization is usually expressed quantitatively as an epoxide equivalent which is calculated by dividing the molecular weight of the resin in question by the average number of epoxide groups present in each molecule. Commercial epoxy resins generally have molecular weights of between 350 and 4000 and epoxide equivalents of about 185 to about 375.

The present invention thus embodies the discovery that the selection of a particular restricted class of bisphenols as starting materials for the production of epoxy resins, will permit the manufacture of resins having certain unusual and valuable physical and chemical properties. More specifically, the use of cetrain meta-alkylated bisphenols has now been found to result in finished resins having substantially increased resistance to chemical attack, together with better oil solubility, higher flexibility, and reduced brittleness all as compared to resins derived from the presently used bisphenols. Most specifically, in order to gain the above mentioned valuable properties, the starting materials must contain substantial quantities of alkylated bisphenols which have the critical molecular structure described in detail below:

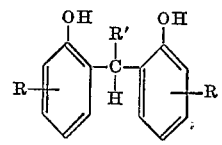

where R is a monovalent hydrocarbon radical selected from the class consisting of alkyl and phenylalkyl radicals having form 4 to 12 carbon atoms in a position meta to the hydroxy group; where the R groups may be the same or different; and where R' is selected from the class consisting of hydrogen, aliphatic hydrocarbon radicals having from 1 to 10 carbon atoms, substituted aliphatic hydrocarbon radicals having from 1 to 10 carbon atoms containing a substituent selected from the class consisting of fluorine, chlorine, bromine, hydroxy and nitro substituents, and substituted aromatic hydrocarbon radicals having from 6 to 10 carbon atoms containing a substituent selected from the class consisting of fluorine, chlorine, bromine, hydroxy and nitro substituents.

Included among the satisfactory starting materials for the practice of the present invention are the following specific compounds:

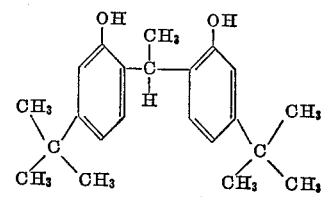

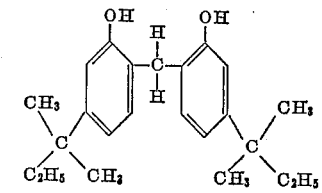

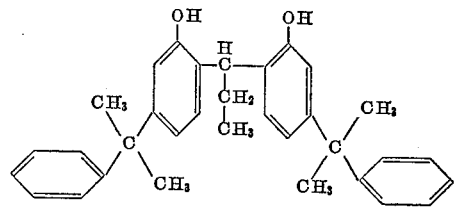

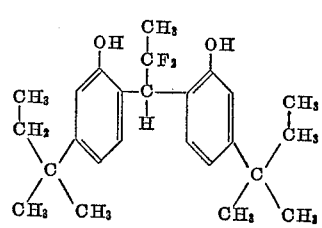

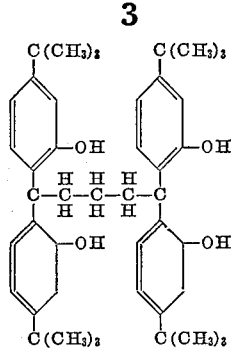
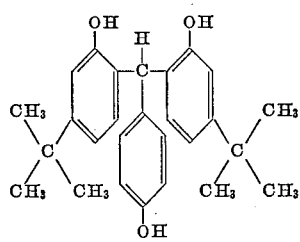
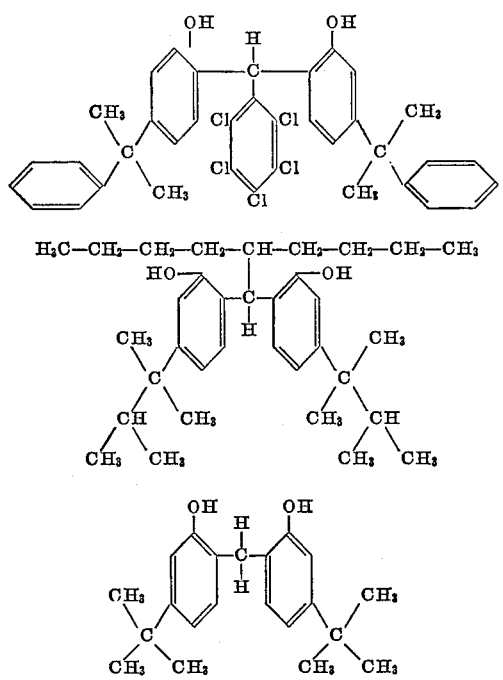

All of the compounds mentioned or described above may be prepared according to the methods taught by U.S. Patent 3,057,928 filed on Oct. 30, 1959, and issued Oct. 9, 1962, to Francis Frederick Koblitz and Paul Daniel Morton.

The improved chemical resistance of epoxy resins prepared from the bisphenols described above is believed to result both from the presence of the nuclear substituents themselves and from their position on the nucleus. The meta-substituted bisphenols of the invention are relatively unreactive toward strong chemical agents such as fuming nitric acid and the like apparently due to steric hindrances resulting from the bulky substituent at the meta position. Therefore, the epoxy ether resins which are prepared from the bisphenols of the invention are exceptionally resistant to agents such as nitrating agents, sulfonating agents, and halogenating agents which otherwise would tend to attack reactive positions on the phenol nuclei.

The epoxy resins of the present invention themselves consist of, or contain substantial quantities of, recurring units having the structural formula:

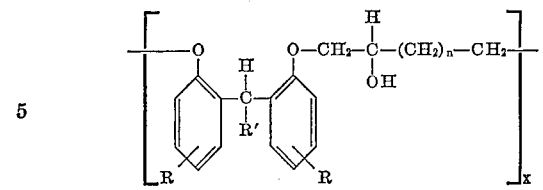

in which $n=0$ to 10 and preferably 0 to 6, in which $x=1$ to 10 and preferably 1 to about 5 and in which R and R' are as defined above, and where the R substituents are in a position meta to the oxygen atom. The epoxy resins probably contain terminal groups of the structure:

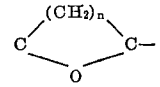

wherein $n=0$ to 10 and preferably 0 to about 6, or of the structure:

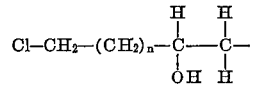

wherein $n=0$ to 10 and preferably 0 to about 6 or of the substituted dihydroxydiphenyl methane group:

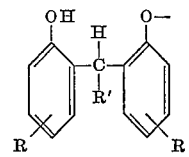

wherein R and R' are as defined above.

It is also possible to co-condense a mixture of bisphenol A (dihydroxydiphenyl-dimethylmethane) or other known bisphenol and the meta alkyl substituted dihydroxydiphenyl methanes described above with epoxy compounds such as epichlorohydrin to obtain epoxy resins containing a substantial number of the following repeating structure:

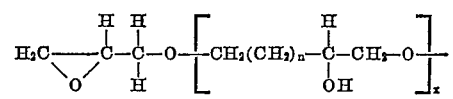
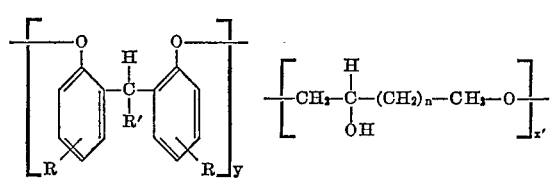
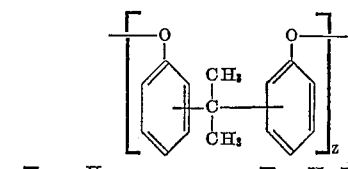
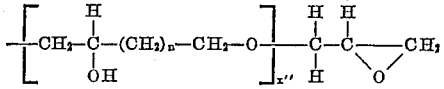

wherein $n=0$ to 10 and preferably 0 to about 6, $x$ is 0 to 25 and preferably 0 to about 10, $y$ is 1; R and R' are as defined above, and where the R substituent is in a position meta to the oxygen atom; $z$ is 0 or 1; $x'$ is from 0 to 25 and preferably from 0 to about 10, and $x''$ is from 0 to about 25 and preferably from 0 to about 10, Monomeric epoxide compounds of relatively low molecular weight may also be prepared by the present invention. Where the epoxy compound is epichlorohydrin such compounds will generally have the formula:

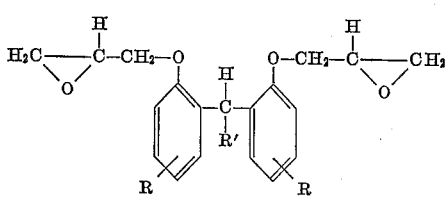

where R and R' are as defined above and the R substituents are in a position meta to the oxygen atom.

The epoxy resins of the present invention are obtained by condensing the above-described meta-substituted bisphenols with a compound containing at least two reactive groups in the presence of sufficient alkali. The two reactive groups must be either halogen atoms or oxiran rings. In order to form epoxy resins, di-reactive compounds which contain no oxiran ring must have at least one hydroxyl group capable of forming an oxiran ring by dehydrochlorination during the process of condensation with the bisphenol. The preferred di-reactive compounds are chlorohydrins, including glycerol dichlorohydrin, and most preferably epichlorohydrin.

The alkali may be any of the commonly available inorganic alkalis including sodium hydroxide, potassium hydroxide, lithium hydroxide and the other alkali metal hydroxides. The amount of alkali will generally be slightly in excess of the molecular equivalent of the halogen released in the reaction.

The reaction may be carried out at a temperature of from 50° C. to 125° C. and preferably of from 80° C. to 110° C. with a temperature of about 100° C. being most preferred.

Reaction times will vary from about 1 minute to several days with most reactions being essentially complete in from 2 to about 8 hours.

The preferred apparatus for the preparation of the epoxy resins is a glass or stainless steel vessel equipped with an agitator, a tight lid and a reflux condenser. Heating will be accomplished by electrical resistance type mantles, by hot water, by other liquid heat transfer media, by steam, or by any other convenient means. The heat exchange device may be either a jacket around the reaction vessel or a calandria or coil contained within the vessel, or a shell and tube exchanger located on a side arm through which the reactants are circulated.

The ratio of the difunctional compound to the meta-alkyl bisphenol will range from about 2 to about 10 and preferably from 3 to 6 moles of the difunctional compound per mole of bisphenol.

After the reaction is complete, the resin is purified by filtering the reaction products, washing with water while dissolved in organic solvents, as for example toluene, and generally refiltering. The filtrate is then distilled under reduced pressure until the desired purity is obtained. The reduced pressure is generally maintained for an additional period of from one minute to about one hour in order to completely remove higher boiling impurities. The purification steps will necessarily vary according to the reactants and the purity standards required of the final product. It should be understood that all of the above steps may be either batch or continuous operation.

The preparation of the bisphenol and of the epoxy resins of the present invention is illustrated by Examples 1, 8, 9, 10 and 11. Preparation of valuable casting compounds from the epoxy resins of the invention is illustrated by Examples 2, 3, and 4. The preparation of superior surface coatings by methods less expensive than those now being used commercially is illustrated by Examples 5, 6, 7, 12 and 13. The new resins of the invention may also be used in caulking compounds as demonstrated by Example 15, and in laminates as demonstrated by Example 14. The modification of the resins by copolymerization with different bisphenols is illustrated by Example 16.

Casting compounds may be formed by mixtures of the epoxy resin of the present invention with urea formaldehyde resins as in Example 4, or with melamine-formaldehyde resins as in Example 5. In either case the catalyst will generally be selected to provide a pot life of several hours and satisfactory curing agents will include secondary and tertiary amines, tertiary amine salts and boron trifluoride complexes. The most preferred catalyst is triethylenetetramine. Catalyst ratios of from 2 to about 15 parts by weight per hundred parts of resin and preferably of from 5 to about 10 parts per hundred parts of resin will generally be employed. The ratio of the epoxy to the other resin will be from about 5:1 to about 1:5 with ratios of about 1:1 being preferred. Curing temperatures will range from room temperature to about 180° C. with temperatures of about 120–160° C. being preferred. Curing times will be to some extent proportional to the curing temperature, will range from about 60 minutes to about 48 hours and will generally fall within an interval of from 2 to about 8 hours. Use of larger amounts of catalyst will, in general, reduce curing time.

Caulking compounds may be formed from the resins of the present invention by the use of catalysts as discussed under casting compounds, together with suitable fillers such as whiting, titanium dioxide, and air floated silica.

These new casting and caulking compounds are particularly useful as encapsulation media especially for electrical components. In this use, the improved resistance to chemical attack and weathering due to their chemical structure are especially valuable.

Baking type surface coatings may be prepared from the epoxy resins by mixing them with partially polymerized tung oil at room temperature. This elimination of the "cooking" operation commonly required in the preparation of epoxy resin coatings offers a valuable economic advantage both from the standpoint of the reduction in labor resulting from the elimination of the cooking step and also from the elimination of the need for heated, temperature controlled manufacturing equipment. The resins of the present invention may be mixed with the tung oil in simple open containers and the retention time in the container need be only sufficient to permit thorough mixing. Alternatively, the ease of preparation of the new surface coatings permits the use of continuous mixing equipment and now makes continuous commercial production of epoxy surface coatings feasible.

In manufacturing surface coatings, a ratio of about 20 to about 200 and preferably from 150 to about 50 parts of tung oil per 100 parts by weight of resin will be used. Curing times will range from about 30 minutes to about 2 days at temperatures of from room temperature to about 200° C. and preferably from about 120° to about 180° C. The addition of a catalyst of the type described in the above discussion of casting compounds reduces curing time and provides a harder surface coating.

Spar varnishes and other types of varnishes may be prepared from the resins of the present invention by adding mineral spirits and/or polyunsaturated oxidizable vehicles in place of a portion of the tung oil used in the above described preparation. The ratios of resin to other organic liquids will be the same as those described for the tung oil preparation. To achieve satisfactory film hardening, particularly in thick layers of surface coating, oxidation catalysts generally called "driers" will be added in amounts of from 0.5 to 10 parts per hundred parts of resin. These catalysts will be the usual commercial oxidation catalysts including the napthenates, tallates, octoates, and resinates of cobalt, lead, iron, zinc, nickel and manganese. Frequently it will be desirable to use two or more catalysts in varying proportions in order to achieve the optimum degree of cure.

Example 13 illustrates the excellent moisture and abrasion resistance of the coatings prepared from the resins of the present invention as compared to high quality commercial resin coatings.

*Example 1.—Preparation of 2,2'-dihydroxy-4,4'-di-tert.-butyldiphenylmethane and epoxy resin derived therefrom*

300 g. (2.0 moles) of m-tert.-butylphenol, 25.2 g. (0.29 m.) of Formalin and 0.64 g. of zinc oxide are placed in a 500 ml. three-necked flask equipped with a stirrer, thermometer, and reflux condenser. The reaction mixture is stirred and refluxed for 2½ hours at 109° C. The reaction mixture is then allowed to cool to room temperature and stand overnight.

On the following day, the reaction mixture is heated without the condenser until the temperature reaches 160° C. It is held at this point for 30 minutes to distill off excess water and drive the reaction to completion.

The reaction mixture is dissolved in hot xylene, filtered hot to remove the zinc oxide, crystallized and filtered on a Buchner funnel. The product is recrystallized twice from xylene and washed each time on the filter with ligroine.

16 g. of white crystalline powder is obtained which melts at 173–174° C. this being 2,2'-dihydroxy-4,4'-di-tert-butydiphenylmethane.

15.6 g. (0.05 m.) of the above biphenol 46.25 g. (0.5 m.) of epichlorohydrin, and 10 drops of water are placed in a 300 ml. 3-necked round-bottom flask equipped with a stirrer, reflux condenser, thermometer, and heating mantle. The reaction mixture is stirred vigorously at 90–100° C. while 4.2 g. (0.105 m.) of solid NaOH is added, ⅓ at a time, at 10 minute intervals. The heating and stirring are continued 4½ hours at 95–100°.

The reaction mixture is filtered, washed with 100 cc. of toluene, and filtered again. The filtrates are then distilled under reduced pressure until a temperature of 150° and a pressure of 20 mm. are reached. The resin is kept under these conditions for 15 minutes, then poured off, and weighed.

16 g. of nearly colorless resin is obtained having a flow point of about 64° C. and consists essentially of the recurring units:

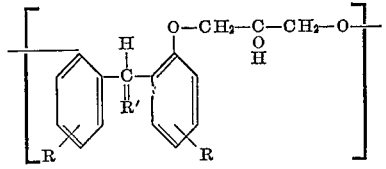

with

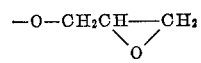

end groups

The properties of the epoxy resin prepared in Example 1 are demonstrated by Examples 2 through 6 which follow.

*Example 2.—Casting compound*

When 4.5 g. of the epoxy resin prepared above and 0.5 g. triethylene tetramine are mixed together, a hard, clear, transparent, tack-free resin results which cures completely in less than 24 hours at room temperature.

*Example 3.—Casting compound*

When 3.5 g. of a commercial urea-formaldehyde resin (Uformite MX–61 described in Catalogue C–16–49 of Rohm & Haas Company) is mixed with 3.0 g. of the epoxy resin of Example 1 the resultant mixture is clear and homogeneous, and does not cure after 3 hours at 140–150° C. Approximately 0.02 g. hexamethylene tetramine is then added and heating at 140° is continued overnight. The material cures hard, clear and tack-free.

*Example 4.—Casting compound*

3.5 g. of a commercial melamine-formaldehyde (Beckamine p–196–Reichhold Chemical Company) is mixed with 3.0 g. of the epoxy resin of Example 1. This mixture does not cure after 3 hours at 140–150° C. Approximately 0.02 g. hexamethylene tetramine are added and the material heated overnight at 140° C. It then cures hard, clear and tack-free.

*Example 5.—Surface coating resin*

1 g. tung oil mixed at room temperature with 1 g. of the epoxy resin of Example 1 gives a clear, transparent, flexible film that remains slightly tacky after 16 hours at 140° C.

*Example 6.—Surface coating resin*

1 g. linseed oil mixed at room temperature with 1 g. of the epoxy resin of Example 1 produces a clear, transparent, flexible film after 16 hours at 140° C. which retains a slight tack.

*Example 7.—Highly flexible and adhesive corrosion-resistant varnish*

A highly sterically hindered bisphenol is prepared by condensing 100 g. (0.67 m.) of m-tert.-butylphenol with 14.4 g. (0.2 m.) of isobutyraldehyde. 10 g. of conc. HCl in 10 g. of water is added as the catalyst, and the mixture is stirred and refluxed vigorously at 95–100° C. for 4 hours. The reaction mixture is cooled to room temperature with stirring and the water phase is decanted off. The gummy solid phase is washed by decantation four times with water, diluted with 50 g. of ligroine, filtered on a Buchner funnel, sucked dry and washed three times with 20 ml. portions of ligroine. The solid product is dissolved in 400 cc. of xylene, filtered hot, and crystallized. The product is recrystallized twice from xylene, washing after each crystallization with n-heptane. A white, crystalline product is obtained with a melting point of 214–216° C. The yield is 53 g. (75% based on the quantity of isobutyraldehyde used). The structure of the bisphenol is confirmed to be:

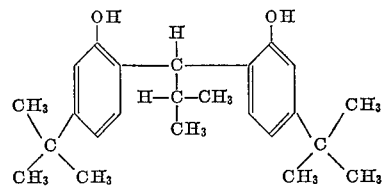

by elementary and infrared analyses and by chemical evidence gained by substitution and derivative reactions.

This bisphenol is used to prepare internally plasticized epoxy ether resins with the approximate structure:

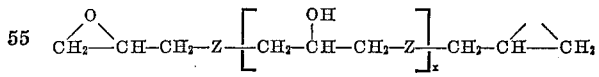

where $Z=$

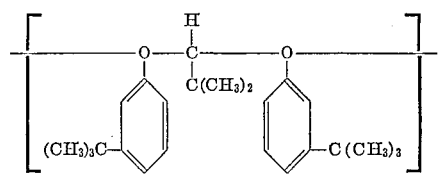

where $x$ may be 0 to 5 according to the desired epoxide equivalent and melting point of the resins.

The bisphenol described above, 1,1-bis(2-hydroxy-4-tert-butylphenyl)-2-methylpropane, is taken in 0.055 m. quantity (23 g.) with 60.2 g. of epichlorohydrin and stirred 30 minutes at 90–100° C. During this time 6.3 g. of solid NaOH is added a pellet at a time. The reaction mixture is maintained at 90–100° C. for four hours with stirring and refluxing. 100 g. of toluene is added, the mixture is filtered and the toluene is distilled off. The distillation is continued under reduced pressure until the bubbling stops at 150° C. and 25 mm. pressure.

26 g. of translucent, cream-colored resin is obtained. The flow point of the resin is approximately 80° C. The resin is miscible with both tung oil and n-heptane.

These resins are found to be miscible with vegetable oils and to some extent even with saturated aliphatic hydrocarbon solvents. The apparent flexibility of these resins in vegetable oil derivatives when hardened in bulk appears to stem from the reduction of the high crystallinity of the usual epoxy ether structure, typically:

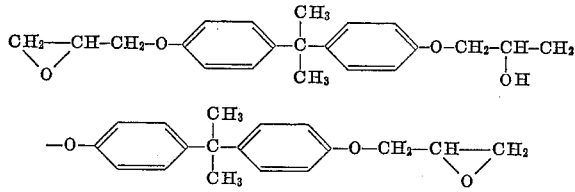

These highly regular, para condensation products are the brittle, polar solvent susceptible epoxy resins of commerce. In the ortho condensed epoxy resins of this invention the bulky phenyl residues combine with the bulky meta alkyl groups to prevent crystallinity and promote a non-polar character in the resins.

10 g. of the resin prepared as above described is mixed with 26.4 g. bodied tung oil at room temperature. No heating or cooking is required to obtain complete dissolution of the resin in the oil. 0.17 g. cobalt naphthenate (6% cobalt), 0.66 g. lead naphthenate (24% lead) and 29.6 g. mineral spirits are stirred into the mixture.

This varnish when coated on tin plate is dry with only slight tackiness in two hours and is hard and tack-free in 4 hours. Its flexibility is tested by bending a tin plate panel double so that the radius of the inside of the bend is less than 1/16". No cracking, crazing or peeling results in the varnish coating.

*Example 8.—Preparation of epoxy resins*

100 g. (0.67 m.) of recrystallized m-tert-butylphenol, 11.6 g. (0.2 m.) of propionaldehyde, 20 g. of conc. HCl and 20 g. of water are placed in a 300 ml. round-bottom, 3-necked flask. These are stirred vigorously, and refluxed at 95–100° for 4 hours. The reaction mixture is cooled to room temperature with stirring, and the water phase is decanted off. The gummy solid phase is washed by decantation four times with water and then diluted with 50 g. of ligroine. The mixture is then filtered on a Buchner funnel, sucked dry, and washed with 3–20 ml. portions of ligroine. The solid product is dissolved in 400 cc. of xylene, filtered hot, and crystallized.

The product is filtered off on a Hirsch funnel, washed twice with ligroine, and dried overnight at 80° C.

Yield: 49 g. Theo. yield: 68.0 g. (0.2×340 g.). Percent yield: 72%. M.P.: 205–206° C.

The product is white and crystalline. A very faint phenol smell is present. The M.P. is unchanged when the product is recrystallized again from xylene. This bisphenol has the structure:

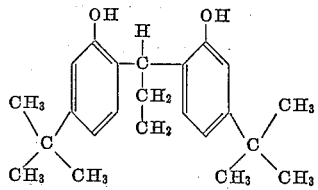

138.75 g. (1.5 m.) of epichlorohydrin, 25.5 g. (0.075 m.) of the above bisphenol, and 51.5 g. (0.225 m.) of Bisphenol A are stirred and heated at 90–100° C. as 24.5. (0.613 m.) of solid NaOH is added over a period of 30 minutes. Stirring and heating are continued at 90–100° C. for 4 hours.

The reaction mixture is dissolved in 200 g. of toluene, filtered, washed twice with water, and distilled to remove the toluene. The distillation is continued at 25 mm. until no more bubbling occurs at 100° C.

The product is a pale, straw-colored, translucent resin which barely flows at room temperature. 94 g. of product are obtained. The product is soluble at room temperature in tung oil, and it is slightly soluble in heptane. A comparable commercial epoxy resin, Shell Chemical Company Epon 828, based completely on Bisphenol A, is insoluble in tung oil at room temperature and poorly miscible even when hot.

*Example 9.—Preparation of epoxy resins*

100 g. (0.666 mole) of m-tert-butylphenol, 13.4 g. (0.2 m.) of isobutyraldehyde, 10 g. of concentrated HCl, and 10 g. of water are placed in a 300 ml. round-bottom, 3-neck flask. These are stirred vigorously and refluxed at 95–100° C. for about 4 hours. The reaction mixture is cooled to room temperature with stirring and the water phase decanted off. The solid phase is washed by decantation four times with water and then diluted with 50 g. of ligroine. The mixture is then filtered on a Buchner funnel, sucked dry, and washed with 3–20 ml. portions of ligroine. The solid product is dissolved in 400 cc. of xylene, filtered hot, and crystallized. The product is recrystallized from xylene and washed twice with n-heptane. A white crystalline product is obtained having the following structure:

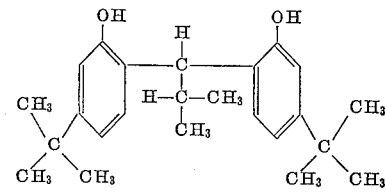

Melting point: 214 to 216° C. Yield: 53 g. Theo. yield: 70.8 g. (0.2×354 g.). Percent yield: 75% (based on $C_3H_7CHO$).

23 g. (0.065 m.) of the above bisphenol, 60.2 g. of epichlorohydrin, are stirred at 90–100° C. while 6.3 g. of NaOH is added over a half-hour period.

The reaction mixture is maintained at 90–100° C. for 4 hours, with stirring. 100 g. of toluene is added, the mixture is filtered, and the toluene is then distilled off. The distillation is continued under reduced pressure until the bubbling nearly stops at 150° C. and about 25 mm. of mercury.

The product is a translucent, cream-colored resin which flows at ca. 80° C. 26 g. is obtained. The resin is miscible with both tung oil and n-heptane and can be used in concentrated solutions in both drying oils and saturated hydrocarbons.

*Example 10.—Modified epoxy resin*

138.75 g. (1.5 m.) of epichlorohydrin, 31.2 g. (0.1 m.) of the bisphenol prepared in Example 1, 45.8 g. (0.2 m.) of Bisphenol A and 2 g. of water are charged into a 300 ml. round-bottom, 3-necked flask equipped with a thermometer, a stirrer, a condenser, and a heating mantle. The temperature is maintained at 90–100° while 24.5 g. (2.04×0.3 m.) of solid NaOH is added over a 30 minute period. The solution is stirred and heated at 90–100° for 3 hours. It is then diluted with 150 cc. of toluene, filtered, and heated under reduced pressure until no more bubbles are evolved at 120° and 2 mm.

A light yellow, translucent resin is obtained which is barely fluid at room temperature.

*Example 11.—Preparation of bisphenols and epoxy resins*

300 g. m-tert.-butylphenol, 25.2 g. formalin, and 0.64 g. of zinc oxide are stirred vigorously and heated at reflux for 2½ hours. The reflux condenser is then removed, and the temperature is allowed to rise to 160° as the water distills off. The temperature is held at 160° as the water distills off. The temperature is held at 160° for ½ hour. Stirring and heating are stopped and the reaction mixture is filtered hot on a hot Buchner funnel to remove the ZnO.

The filtrate is allowed to cool, 50 g. of methanol and 50 g. of ligroine are added, and the solution is refrigerated overnight at −20° F. The solvents are then stripped off under reduced pressure, and the residue refrigerated again. The residue is then filtered on a Buchner funnel. The filtrate is retained for use later.

The solid product is heated with ligroine, cooled, filtered, and washed with ligroine on the filter. This process is repeated three times. The product is then pressed down on a porous plate and dried 4 hours at 70° C. Weight of product is 16 g. Melting point is 170–171° C. and has the following structure:

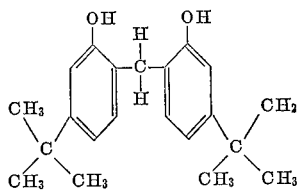

The above preparation is repeated. The reaction time at reflux is 3½ hours, instead of 2½ hours. The water is distilled off at 170° for 30 minutes. The reaction mixture is filtered hot on the Buchner funnel to remove the ZnO. When the filtrate has cooled to about 40°, 100 g. of ligroine is added, and the solution is cooled to 5° in the refrigerator overnight. The cream-colored precipitate is filtered off on the Buchner and washed with two 10 g. portions of ligroine. The product is recrystallized from xylene, filtered, washed with ligroine, and dried overnight at 70° C. Weight: 22 g., M.P. 169–171° have the above structure.

The filtrate is heated under reduced pressure until bubbling has stopped at 75° and 25 mm. 50 g. of m-tert-butylphenol, 25. 2 g. of formalin and 0.64 g. of ZnO are added, and the solution is stirred and refluxed 3½ hours. The purification procedure is repeated as before, and 42 g. of product melting at 169–171° is obtained having the above structure.

The filtrate from the purification of the product is reused after being combined with the filtrate from the first run above and removing the solvents.

400 g. of the combined filtrates, 25.2 g. formalin, and 0.64 g. of ZnO are allowed to react in the general reaction scheme used previously. This time, however, the hot product is purified by repeated washing in a beaker with hot ligroine. 57 g. of product melting at 168–170° having the above structure are obtained. Refluxing is at 119° C. and heating time is 4 hours. 46.8 g. (0.15 m.) of the above bisphenol products, 1.5 g. of water and 138.75 g. (1.5 m.) of epichlorohydrin are heated to 90–100° C. and stirred vigorously as 12.24 g. (2.04×0.15 m.) of solid NaOH is added in 4 g. portions at 15 minute intervals. Stirring and heating are continued at 90–100° C. for 5½ hours. The reaction mixture is filtered and distilled under reduced pressure until no bubbling occurs at 160° C. and 5 mm. The reaction mixture is then dissolved in toluene, filtered, and heated under reduced pressure until no bubbling occurs at 170° C. and 5 mm.

56 g. of resinous product is obtained. It is slightly cloudy and pale straw-colored. The flow point is 60 to 70° C.

*Example 12.—Abrasion and water resistant spar varnish from epoxy resin*

10 g. of the epoxy resin prepared in Example 11 and 15 g. of blown tung oil are heated and stirred 4 hours at 175° C. 40 g. of mineral spirits is added, and the solution is stirred until homogeneous. 0.25 g. of 6% cobalt naphthenate and 0.125 g. of 24% lead naphthenate are added and dissolved.

Three 3 x 3″ pieces of ¼″ plywood are painted with the varnish, allowed to dry 2 hours, and then given another coat. After drying overnight, a third coat is applied.

The varnish coated samples are compared with samples similarly prepared using "Gliddenspar" spar varnish (Glidden Corp.). On immersion in 80° C. water for 24 hours, a "Gliddenspar" panel began de-laminating. The epoxy varnish panel was unaffected.

Sample panels of each of the varnishes are abraded with 700 g. of 80 grit silicon carbide using ASTM method D1242–56 (method A). The epoxy varnish panel is essentially unaffected, and the "Gliddenspar" panel shows slight roughening and loss of gloss.

*Example 13.—Varnishes from epoxy resins*

(A) 10 g. of the epoxy resin prepared in Example 11 and 15 g. of blown tung oil are heated and stirred at 175° C. for approximately 4 hours. At this time, gelation begins, and heating is discontinued. 40 g. of mineral spirits is added, and the solution is stirred until homogeneous. 0.25 g. of 6% cobalt naphthenate and 0.125 g. of 24% lead naphthenate are added and dissolved.

Plywood squares coated with the varnish dry tack-free in 2 hours. A glossy, clear finish is obtained.

(B) 50 g. of a commercial heat reactive phenolic resin (BR 9400, manufactured by the Bakelite Division, Union Carbide Corporation), and 132 g. of tung oil are heated rapidly to 230–240° C. and held there 1 hour and 10 minutes until gelation begins. At this time it is poured out into xylene and cooled as rapidly as possible to room temperature. Its non-volatile ocntent is then determined, and adjusted to 55% non-volatiles. 0.85 g. of 6% cobalt naphthenate and 3.3 g. of 24% lead naphthenate are then added.

This varnish is prepared for use as a standard phenolic varnish.

(C) 50 grams (⅓ mole) of 90% m-tert.-butylphenol, 26 grams (0.5 mole) of 37.5% formaldehyde, and 1 gram of triethanolamine are heated 100 minutes at reflux. The temperature is then reduced to 50° C. and the water is distilled off under gradually reduced pressure. The pressure is held at about 120° C. and 10 mm. Hg for about 3 hours and then poured off. 46 grams of a light orange-brown color product is obtained. The product softens at 50–60° C.

When two grams of product is mixed with two grams of hexamethylenetetramine and heated at 160° C. for six hours, no gelation occurs indicating that m-tert.-butyl-phenol is bifunctional or less.

30 grams of the above prepared varnish is mixed with 79 grams of tung oil, heated rapidly to 235° C. with stirring and held there one hour and 50 minutes. The material is then cooled to room temperature with stirring, and 81 grams of xylene added. The non-volatile content is determined and adjusted to 55% non-volatiles. 0.5 gram of 6% cobalt napthenat and 2 grams of 24% lead napthenate are then added.

(D) 50 grams of the epoxy resin prepared in Example 11 and 132 grams of tung oil are heated one hour at 240° C. and 30 minutes at 100° C. The product is stored two days. Cooking is resumed at 150° and continued for 6 hours. The non-volatile content is adjusted to 55% and the catalysts are added as in B and C above.

*Tests on epoxies and phenolic varnishes*

The varnishes are identified by the letter of the paragraph in Example 13 which describes their preparation.

(I) Resistance to boiling water (three hour immersion):

| | |
|---|---|
| Varnish A | Very good. |
| Gliddenspar (commercial spar varnish, Glidden Company) | Do. |
| Varnish B | Do. |
| Varnish C | Do. |
| Varnish D | Do. |

Very good resistance to boiling water consisted of a tightly bonded, non-tacky, non-wrinkled coating at the conclusion of the test.

(II) Resistance to alkali for 7 hours at 25° C. (5% aqueous sodium hydroxide solution):

Varnish A _____ Very good, but peeled.
Gliddenspar _____ Do.
Varnish B _____ Do.
Varnish C _____ Do.
Varnish D _____ Do.

Very good indicates coating not appreciably attacked.

(III) Resistance to distilled water (100 hours at 25° C.):

Varnish A _____ Very good.
Gliddenspar _____ Do.
Varnish B _____ Cloudy, otherwise very good.
Varnish C _____ Very good.
Varnish D _____ Do.

Same rating scale as in (I) above.

(IV) Sward hardness (film hardness determined by Sward hardness rocker):

Varnish A _____ 6
Varnish B _____ 36
Gliddenspar _____ 10
Varnish C _____ 17
Varnish D _____ 15

*Example 14.—Laminates from epoxy resins*

16 g. of the epoxy resin prepared in Example 11, 2 g. of amine curing agent (amine curing agent D, described in Catalogue SC:60-302 of Shell Chemical Company) and 16 g. of acetone are mixed. 10 plies of polyester laminating cloth manufactured of Du Pont Dacron polyester fiber are dipped into the solution, allowed to drain dry and air dried for 30 minutes. The plies are then dried in the oven 30 minutes at 70°, laminated under pressure 20 minutes at 300° F., heated 2 days at 80° and laminated under pressure for 1 hour at 300° F. Flexural strength on three samples is 2770, 3200 and 5710 p.s.i.

30 g. of the epoxy resin of this example are catalyzed by adding 4.5 g. of amine curing agent (Shell Curing Agent D, Shell Chemical Company). The solution is used to bond a 10 ply laminate of polyester laminating cloth (Dacron Ex–Fu–1331 manufactured of Du Pont polyester fiber). The laminate after laying up is cured 3 hours at 300° F. The cured laminate is cut into half-inch strips ⅛ inch thick and 4 in. long. These are tested for flexural strength and the average of two samples is 2900 p.s.i.

*Example 15.—Caulking compounds*

(A) A caulking compound is prepared using 12.5 g. of a commercial epoxy resin (Epon 828, Shell Chemical Company) 2.5 g. of a polyamine type epoxy hardener (X 7037, manufactured by Pennsalt Chemicals Corporation), 10 g. of Cab-O-Sil (airfloated silica, Godfrey L. Cabot Corporation) and 20.0 g. 9:2 whiting:titanium dioxide mixture. This material cures rapidly at room temperature, and is hard and brittle.

(B) A caulking compound is prepared identical to the above except Epon 828 is replaced by the same amount of the epoxy resin prepared in Example 14. This material is also very hard and brittle.

*Example 16.—Modified epoxy resins*

100 g. of a commercial epoxy resin (Epon 562, described in Catalogue SC:54-46 of Shell Chemical Company) is heated and stirred 2 hours at 150° C. with 10 g. of the bisphenol prepared in Example 11. The viscosity goes from 175 cp. at 25° C. to 800 cp. at 25°. The color darkens to a dark straw color and the mixture becomes slightly turbid.

An additional 10 g. of the bisphenol prepared in Example 11 is added, and the mixture is heated another hour at 150° C. After this heating, the viscosity has increased to 3450 cp. at 25° C.

100 g. of another commercial epoxy resin (Epon 828, described in Catalogue SC:54-46 of Shell Chemical Company) is heated and stirred 3 hours at 150° C. with 20 g. of bisphenol prepared in Example 11. The color darkens slightly, and the viscosity goes from 7,750 cp. at 25° C. to 122,500 cp. at 25° C.

It will be understood that various changes in those details of the invention which have been herein described and illustrated may be made by those skilled in the art within the principle and scope of the invention as expressed in the appended claims, and that the embodiments herein discussed are included only as illustrations.

I claim:

1. An epoxy resin composition comprising the alkali catalyzed condensation product of 2 to 10 moles of a chlorohydrin selected from the group consisting of epichlorohydrin and glycerol dichlorohydrin with one mole of bisphenol of the formula

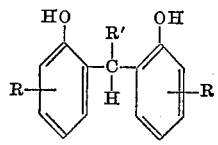

where R is a tertiary alkyl radical having from 4 to 12 carbon atoms and each substituent R is in a position meta to the hydroxy group; and where R' is selected from the class consisting of hydrogen and alkyl radicals having from 1 to 3 carbon atoms.

2. An epoxy varnish produced by mixing the composition of claim 1 with polyunsaturated vegetable drying oil.

3. The epoxy resin according to claim 1 wherein the chlorohydrin is epichlorohydrin and the bisphenol is

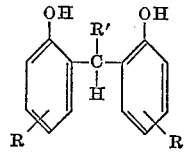

where each of the R groups is tertiary butyl and R' is hydrogen.

4. The epoxy resin according to claim 3 wherein there is 3 to 6 moles of epichlorohydrin per mole of bisphenol.

5. An epoxy resin composition comprising the alkali catalyzed condensation product of 2 to 10 moles of a chlorohydrin selected from the group consisting of epichlorohydrin and glycerol dichlorohydrin with one mole of a mixture of bisphenols consisting essentially of p,p'-isopropylidenebisphenol and a bis(2 - hydroxyphenyl) alkane of the formula

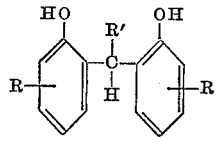

where R is a tertiary alkyl radical having from 4 to 12 carbon atoms and each substituent R is in a position meta to the hydroxy group; and where R' is selected from the class consisting of hydrogen and alkyl radicals having from 1 to 3 carbon atoms.

6. The epoxy resin according to claim 5 wherein the chlorohydrin is epichlorohydrin and the bis(2-hydroxyphenylalkane) is

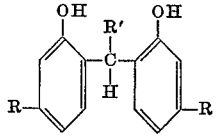

where each of the R groups is tertiary butyl and R' is hydrogen.

7. The epoxy resin according to claim 6 wherein there is 3 to 6 moles of epichlorohydrin per mole of bisphenol.

8. In the production of epoxy resins, the process which comprises condensing at a temperature within the range of 50° C. to 125° C. in the presence of an alkali 2 to 10 moles of chlorohydrin selected from the group consisting of epichlorohydrin and glycerol dichlorohydrin with one mole of a bisphenol having the following formula

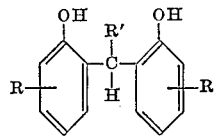

where R is a tertiary alkyl radical having from 4 to 12 carbon atoms and each substituent R is in a position meta to the hydroxy group; and where R′ is selected from the class consisting of hydrogen and alkyl radicals having from 1 to 3 carbon atoms.

9. The process according to claim 8 wherein the reaction temperature is within the range of 80° C. to 110° C.

10. In the manufacture of epoxy resins the process which comprises condensing at a temperature within the range of 50° C. to 125° C. in the presence of alkali 2 to 10 moles epichlorohydrin with one mole of a bisphenol mixture consisting essentially of p,p′-isopropylidenebisphenol and a bisphenol having the following formula:

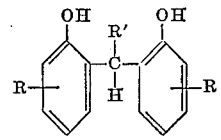

where R is a tertiary alkyl radical having from 4 to 12 carbon atoms and each substituent R is in a position meta to the hydroxy group; and where R′ is selected from the class consisting of hydrogen and alkyl radicals having from 1 to 3 carbon atoms.

References Cited
UNITED STATES PATENTS 3,057,928  10/1962  Koblitz et al. _____ 260—47

WILLIAM H. SHORT, *Primary Examiner.*

T. D. KERWIN, *Assistant Examiner.*

UNITED STATES PATENT OFFICE
CERTIFICATE OF CORRECTION

Patent No. 3,336,250                          August 15, 1967

Francis Frederick Koblitz

It is hereby certified that error appears in the above numbered patent requiring correction and that the said Letters Patent should read as corrected below.

Column 1, line 39, for "disphenol" read -- diphenol --; column 2, line 1, for "cetrain" read -- certain --; line 21, for "form" read -- from --; column 7, line 27, for "biphenol" read -- bisphenol --; lines 45 to 51, for that portion of formula reading

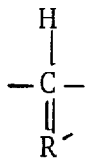      read      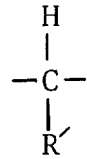

column 8, lines 54 to 56, the structure should appear as shown below instead of as in the patent:

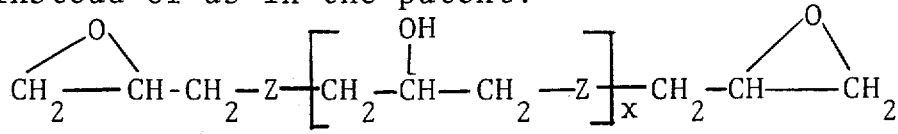

column 12, line 27, for "ocntent" read -- content --; line 52, for "napthenat" and "napthenate", each occurrrence, read -- naphthenate --.

Signed and sealed this 25th day of June 1968.

(SEAL)
Attest:

EDWARD M. FLETCHER, JR.                      EDWARD J. BRENNER
Attesting Officer                                Commissioner of Patents